(12) United States Patent
Hesmer et al.

(10) Patent No.: US 8,631,142 B2
(45) Date of Patent: Jan. 14, 2014

(54) INSERTING TARGETED CONTENT INTO A PORTLET CONTENT STREAM

(75) Inventors: Stephan Hesmer, Holzgerlingen (DE); David B. Lection, Raleigh, NC (US); Joachim Loeffel, Magstadt (DE)

(73) Assignee: International Business Machines Corporation, Armonk, NY (US)

( * ) Notice: Subject to any disclaimer, the term of this patent is extended or adjusted under 35 U.S.C. 154(b) by 2268 days.

(21) Appl. No.: 10/213,858

(22) Filed: Aug. 7, 2002

(65) Prior Publication Data

US 2004/0030795 A1 Feb. 12, 2004

(51) Int. Cl.
*G06F 15/16* (2006.01)

(52) U.S. Cl.
USPC ............ 709/231; 709/203; 709/217; 709/246

(58) Field of Classification Search
USPC .................................. 709/203, 246, 217–219
See application file for complete search history.

(56) References Cited

U.S. PATENT DOCUMENTS

| | | | |
|---|---|---|---|
| 6,327,628 B1 * | 12/2001 | Anuff et al. ................... 719/311 |
| 6,438,575 B1 * | 8/2002 | Khan et al. .................... 709/200 |
| 6,516,349 B1 * | 2/2003 | Lieberman .................... 709/225 |
| 6,610,105 B1 * | 8/2003 | Martin et al. ................. 715/513 |
| 6,625,624 B1 * | 9/2003 | Chen et al. .................... 707/204 |
| 6,636,894 B1 * | 10/2003 | Short et al. ................... 709/225 |
| 6,643,661 B2 * | 11/2003 | Polizzi et al. ................ 707/100 |
| 6,732,178 B1 * | 5/2004 | Van Horne et al. ........... 709/227 |
| 6,802,042 B2 * | 10/2004 | Rangan et al. ............. 715/501.1 |
| 6,832,263 B2 * | 12/2004 | Polizzi et al. ................ 709/246 |
| 6,836,773 B2 * | 12/2004 | Tamayo et al. .................... 707/6 |
| 6,871,193 B1 * | 3/2005 | Campbell et al. ............... 705/67 |
| 6,876,977 B1 * | 4/2005 | Marks ............................ 705/26 |
| 6,917,975 B2 * | 7/2005 | Griffin et al. ................. 709/225 |

* cited by examiner

*Primary Examiner* — Minh-Chau Nguyen
(74) *Attorney, Agent, or Firm* — Marcia L. Doubet (57) ABSTRACT

A system, method and program product for inserting targeted content into a portlet content stream is provided. Specifically, the present invention provides a portal program that includes a container-managed portlet filter for inserting targeted web content into a portlet content stream based on a desired display mode of the portal user. Under the present invention, web content is obtained by a portlet from a content provider. Once obtained, the portlet outputs the web content as a portlet content stream to the portlet filter. The portlet filter then inserts the targeted content based on the desired display mode of the user. The combined targeted content and portlet content stream is then outputted to an aggregator where it is organized for display as a portal page.

24 Claims, 7 Drawing Sheets

My Stocks 54  [edit] 56 [_][X]

New Features! Click Here

Super Tracker Portfolio News

| Symbol | Price | Change |
|---|---|---|
| David's Portfolio [edit] | | |
| Dow | 10,161.48 | -95.63 |
| GWRX | 0.30 | -0.02 |
| IBM | 87.69 | -1.31 |
| INTC | 29.84 | -0.26 |
| MSFT | 55.47 | -1.73 |
| SUNW | 8.95 | -0.20 |
| HAND | 2.77 | -0.18 |
| CSCO | 14.76 | -0.50 |
| RHAT | 4.80 | -0.38 |
| RSH | 30.09 | -0.71 |
| NT | 3.80 | -0.17 |
| Nasdaq | 1,756.56 | -40.27 |

View Full Portfolio

Get Quotes: [    ] [Go]

Market Screener  Find Symbol

Last update 12:20 pm ET
Data delayed at least 20 minutes

INSERTING TARGETED CONTENT INTO A PORTLET CONTENT STREAM

BACKGROUND OF THE INVENTION

1. Field of the Invention

The present invention generally relates to a system, method and program product for inserting targeted content into a portlet content stream. Specifically, the present invention allows the targeted content to be inserted into a portlet content stream based on a desired display mode of the portlet.

2. Background Art

As the use of the Internet becomes more pervasive, better technology is constantly being developed for displaying web content. To this extent, portal servers have become the technology of choice in delivering web content to users. Typically, a portal server includes a portal program (e.g., WEBSPHERE from International Business Machines Corporation of Armonk, N.Y.), which arranges web content into a portal page of portlets. Each portlet includes a section of web content formatted according to a user's preferences. For example, a user could establish his/her own portal page that has portlets for news, weather, and sports. The portal program would obtain the desired web content from the appropriate content providers, aggregate the web content, and then display the web content in the appropriate portlets as a portal web page. This portal technology has led to the explosion of personalized "home" pages for individual web users.

This growth in Internet usage has caused Internet advertising (e.g., banner advertisements, pop-up advertisements, etc.) to become of one of the top revenue producing services of the Internet. Specifically, virtually every web page has some form of advertising associated with it. Unfortunately, much of this advertising is less targeted than it could be. For example, advertising content that is delivered through separate pop-up windows or banner advertisements are easily dismissed/ignored by the users. These types of advertisements have become so widespread that many users often feel that Internet advertising is invading their machine. This has lead to the development of many programs for limiting advertisements from an incoming content stream.

In view of the foregoing, there exists a need for a system, method and program product for targeting web content. Specifically, there exists a need for a system, method and program product for inserting targeted content into a portlet content stream. A need also exists for the targeted content to be inserted based on a desired display mode of a user. This helps ensure that the user's attention is focused where the targeted content is displayed.

SUMMARY OF THE INVENTION

In general, the present invention provides a method, system and program product for inserting targeted content into a portlet content stream. Specifically, the present invention provides a portal program that includes a container-managed portlet filter for inserting targeted web content into a portlet content stream based on a desired display mode of the portal user. Under the present invention, web content is obtained by a portlet from a content provider. Once obtained, the portlet outputs the web content as a portlet content stream to the portlet filter. The portlet filter then inserts the targeted content into the portlet content stream based on the display mode of the portlet as desired by the user. The combined targeted content and portlet content stream is then outputted to an aggregator where it is organized for display as a portal page.

According to a first aspect of the present invention, a system for inserting targeted content into a portlet content stream is provided. The system comprises: (1) a portlet for obtaining web content from a content provider, and for outputting the web content as the portlet content stream; (2) a portlet filter for inserting the targeted content into the portlet content stream based on a desired display mode of the portlet; and (3) a portal aggregator for organizing the portlet content stream with the inserted targeted content into a portal page.

According to a second aspect of the present invention, a method for inserting targeted content into a portlet content stream is provided. The method comprises: (1) receiving web content from a content provider to a portlet, and outputting the web content as the portlet content stream from the portlet to a portlet filter; (2) inserting the targeted content into the portlet content stream based on a desired display mode of the portlet, and outputting the portlet content stream with the targeted content from the portlet filter to an aggregator; and (3) organizing the portlet content stream with the inserted targeted content into a portal page.

According to a third aspect of the present invention, a program product stored on a recordable medium for inserting targeted content into a portlet content stream is provided. When executed, the program product comprises: (1) program code for obtaining web content from a content provider, and for outputting the portlet content stream; (2) program code for inserting the targeted content into the portlet content stream based on a desired display mode of the portlet; and (3) program code for organizing the portlet content stream with the inserted targeted content into a portal page.

Therefore, the present invention provides a system, method and program product for inserting targeted content into a portlet content stream.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAIL DESCRIPTION OF THE INVENTION

In general, the present invention provides a system, method and program product for inserting targeted content into a portlet content stream. Specifically, the present invention provides a portal program that includes a container-managed portlet filter for inserting targeted web content into a portlet content stream based on a desired display mode of the portlet as desired by the user. Under the present invention, web content is obtained by a portlet from a content provider. Once obtained, the portlet outputs the web content as a portlet content stream to the portlet filter. The portlet filter then inserts the targeted content into the portlet content stream based on the desired display mode. The combined targeted content and portlet content stream is then outputted to an aggregator where it is organized for display as a portal page.

It should be understood that as known in the art, the term "portlet" is used to refer both to the visual sections of a portal page, as well as to the program code used to obtain the web content from web providers for display in the visual sections. Thus, a portlet should be understood to have at least two manifestations: (1) a visual portlet displayed as part of a portal page; (2) and a program portlet that includes the program code for obtaining the web content displayed in the visual portlet.

Figure 1:
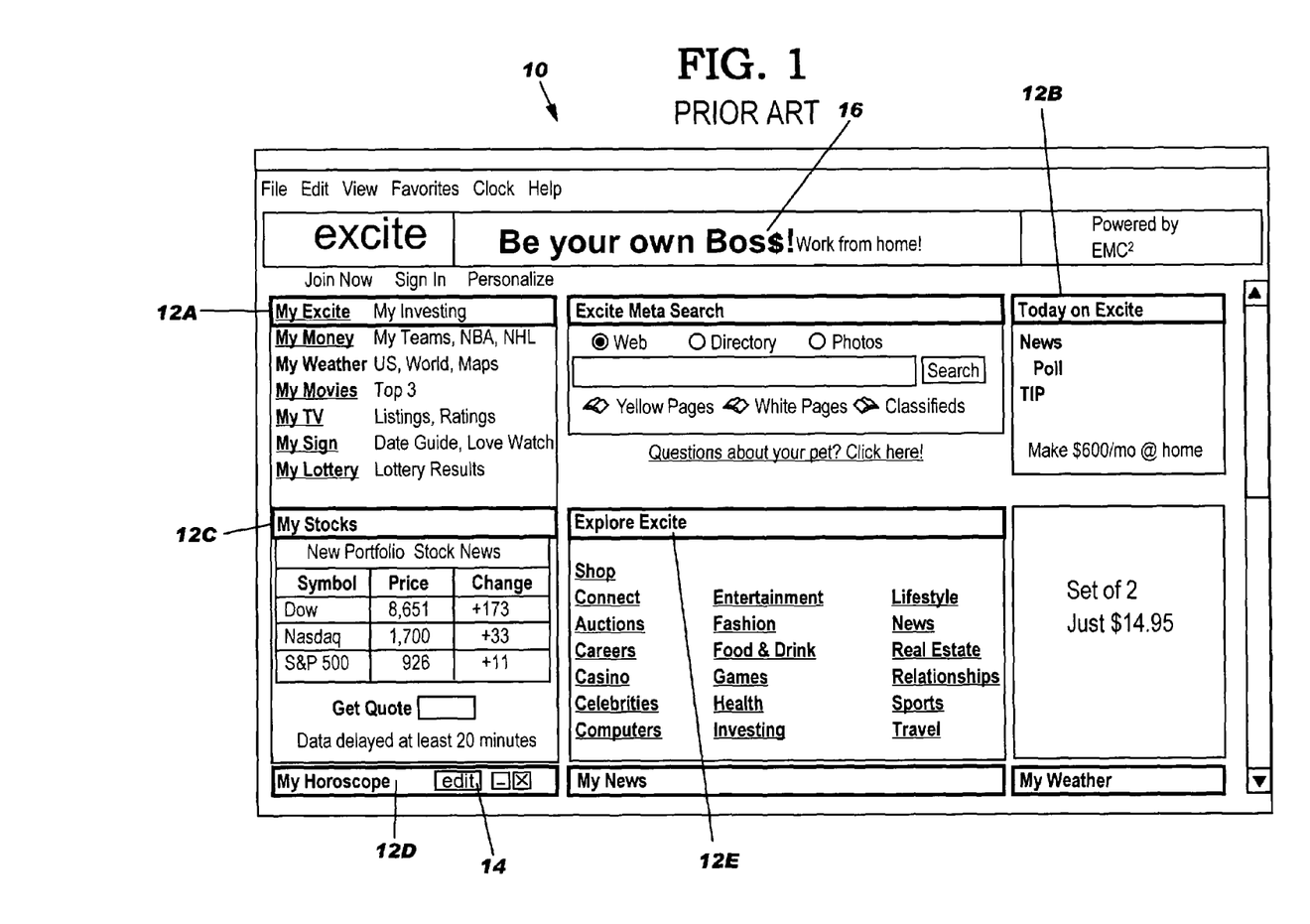
FIG. 1 depicts a related art portal page.

Referring now to FIG. 1, a standard portal page 10 is shown. As indicated above, a portal page is typically generated with a portal program that retrieves and aggregates web content. One type of portal program that is commonly used is WEBSPHERE available from International Business Machines Corp. of Armonk, N.Y. As depicted, portal page 10 includes web content organized/arranged into visual portlets 12A-E. As known in the art, portal page 10 can be configured by a user according to his/her preferences. Specifically, the user could select the type of content (e.g., news, sports, weather, etc.) that is displayed in visual portlets 12A-E. Moreover, the user could select particular pieces of content within each visual portlet 12A-E. For example, for the stock portlet 12C, the user could select particular stocks (e.g., IBM, DOW, etc.) for which content is to be displayed. In general, the visual portlets 12A-E have several display modes such as, among others, view mode, edit mode, configure mode, and help mode. View mode could display portal page 10 as shown (i.e., with all visual portlets 12A-E displayed), or a particular piece of web content within a single visual portlet. Edit mode allows a user to define/redefine each portlet 12A-E. For example, visual portlets 12A-E could each be equipped with an edit button 14, which when selected, would display an edit screen pertaining to the particular visual portlet 12A-E. Thus, if the user wished to add to the stocks displayed in stock portlet 12C, he/she could enter the edit mode and add the desired stocks. Then, the next time portal page 10 was displayed, the added stocks would be displayed in stock portlet 12C. Configure mode is generally accessible by a system administrator for defining the configuration settings of portal page 10. Help mode could be accessed in the event help is required in utilizing a feature of portal page 10. In a typical embodiment, help mode is accessed from an edit screen after the edit mode has been entered. It should be appreciated that the display modes described herein are intended to be illustrative only and are not intended to be limiting. For example, various portal programs could include display modes different from view, edit, configure and/or help. To this extent, the present invention is intended to be implemented based on any display mode currently known or later developed.

As further shown in FIG. 1, banner advertisement 16 has been inserted along a top portion of portal page 10. As indicated above, such advertisements are not only easily dismissed by the user, but also lack optimal targeting. Specifically, the user may be focusing his/her attention on stock portlet 12C and may not even be aware of the precise message within banner advertisement 16. In addition, the products/services advertised in banner advertisement 16 may be of no interest to the user. Accordingly, banner advertisement 16 could amount to a waste of resources.

Under the present invention, the portal program used to generate portal page 10 is equipped with a portlet filter that inserts targeted content (e.g., advertisements, alerts, etc.) into visual portlets 12A-E based on a desired display mode of visual portlets 12A-E (or portal page 10). Specifically, the targeted content is inserted for display on portal page 10 when a particular display mode is deliberately entered. In a typical embodiment, the targeted content is inserted based on a display mode of the visual portlets 12A-E. For example, if the edit display mode is entered for stock portlet 12E, targeted content will be inserted. This type of content insertion is more targeted because, upon entering edit mode, the user will likely be presented with a single (possibly full page) edit window. Moreover, because the user has deliberately entered the edit mode, his/her attention will be focused on the edit window, and he/she will be more likely to view the inserted content.

Figure 2:
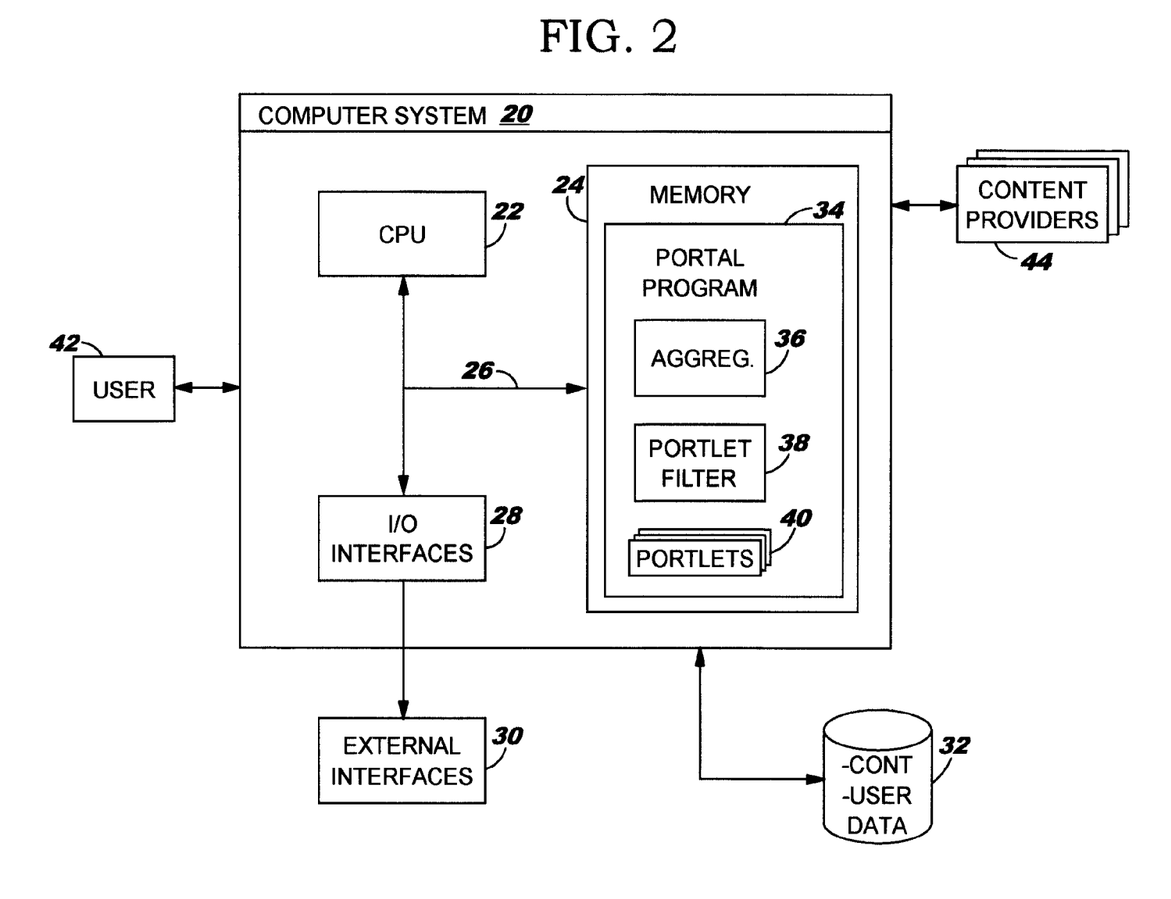
FIG. 2 depicts a computer system having a portal program, according to the present invention.

Referring now to FIG. 2, computer system 20 having portal program 34 according to the present invention is shown. As depicted, computer system 20 generally includes central processing unit (CPU) 22, memory 24, bus 26, input/output (I/O) interfaces 28, external devices/resources 30 and database 32. CPU 22 may comprise a single processing unit, or be distributed across one or more processing units in one or more locations, e.g., on a client and server. Memory 24 may comprise any known type of data storage and/or transmission media, including magnetic media, optical media, random access memory (RAM), read-only memory (ROM), a data cache, a data object, etc. Moreover, similar to CPU 22, memory 24 may reside at a single physical location, comprising one or more types of data storage, or be distributed across a plurality of physical systems in various forms.

I/O interfaces 28 may comprise any system for exchanging information to/from an external source. External devices/resources 30 may comprise any known type of external device, including speakers, a CRT, LED screen, hand-held device, keyboard, mouse, voice recognition system, speech output system, printer, monitor, facsimile, pager, etc. Bus 26 provides a communication link between each of the components in computer system 20 and likewise may comprise any known type of transmission link, including electrical, optical, wireless, etc. In addition, although not shown, additional components, such as cache memory, communication systems, system software, etc., may be incorporated into computer system 20.

Database 32 may provide storage for information necessary to carry out the present invention. Such information could include, among other things, targeted content (e.g., advertisements, alerts, etc.) and user data (e.g., preferences, web traffic history, etc.) As such, database 32 may include one or more storage devices, such as a magnetic disk drive or an optical disk drive. In another embodiment, database 32 includes data distributed across, for example, a local area network (LAN), wide area network (WAN), or a storage area network (SAN) (not shown). Database 32 may also be configured in such a way that one of ordinary skill in the art may interpret it to include one or more storage devices.

It should be understood that computer system 20 is intended to be representative of any type of computerized system that can provide web content to user 42. Examples include a server, a client, a workstation, a laptop, a personal digital assistant, etc. To this extent, computer system 20 could be a system directly accessed by user 42 (e.g., home or office computer), or a web server operating in a location remote from user 42. In addition, it is understood that communication between content providers 44 and computer system 20 can occur via a direct hardwired connection (e.g., serial port), or via an addressable connection. Thus, user 42, content providers 44 and computer system 20 could communicate over the Internet, a LAN, a WAN, a VPN, or other network type.

Stored in memory 24 of computer system 20 is portal program 34. As depicted, portal program 34 includes aggregator 36, portlet filter 38 and one or more program portlets 40. In general, user 42 will communicate with computer system 20 to obtain/view web content from content providers 44. Specifically, user 42 can accesses a portal page (as shown in FIG. 1) by interfacing with computer system 20. The content displayed in each visual portlet in the portal page is obtained from content providers 44 by the program portlets 40. The program portlets 40 will then each output a content stream of markup (e.g., HTML). The streams are ultimately organized by aggregator 36 into the appropriate visual portlets for display as the portal page.

Under the present invention, when user 42 enters a desired display mode for a visual portlet, portlet filter 38 will insert targeted content into the appropriate content stream outputted from the corresponding program portlet 40 (prior to reception by aggregator 36). For example, if user 42 enters the edit mode for a stock visual portlet, targeted content such as an advertisement or an alert will be inserted into the content stream outputted from the stock program portlet 40. Because user 42 has deliberately entered the edit mode, it can be presumed that he/she will be focusing on the edit window that is subsequently displayed. Accordingly, user 42 is more likely to view and "absorb" the inserted targeted content. Furthermore, the targeted content that is inserted can be further focused based upon user data in database 32. Specifically, the targeted content could vary based on user's 42 interests, hobbies, web traffic history, etc. Thus, for example, if user 42 has visited sporting goods websites fifty times in the past week, the inserted targeted content could comprise an advertisement for sporting goods. Alternatively, if the visual portlets user 42 has defined in his/her portal page indicate an interest in technology, the targeted content could comprise an advertisement for the latest hand-held device.

Figure 3:
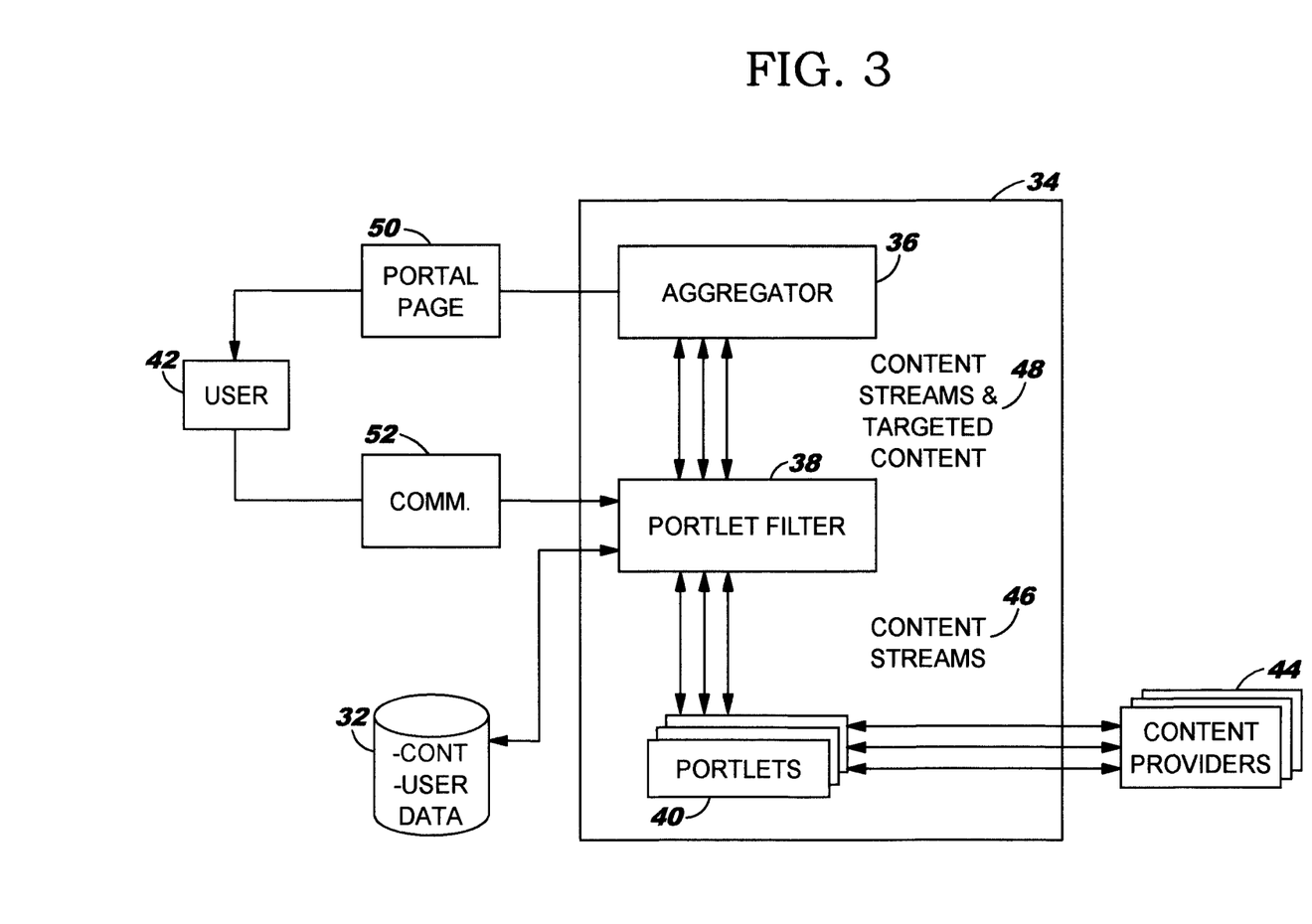
FIG. 3 depicts a more detailed diagram of the portal program of FIG. 2.

Referring now to FIG. 3, a more detailed depiction of portal program 34 is shown. As indicated above, web content is obtained from content providers 44 by program portlets 40. Each program portlet 40 then outputs its respective web content as a separate portlet content stream 46 of markup, all of which are ultimately organized by aggregator 36 into portal page 50. Under the present invention, all communication between aggregator 36 and program portlets 40 pass through portlet filter 38, which inserts targeted content 46 from database 32 into portlet content streams based on a desired display mode. Specifically, when user 42 issues command 52 to enter a desired display mode (e.g., edit, view, help, configure, etc.) of a particular visual portlet (or of a portal page as a whole), targeted content will be inserted by portlet filter 38, and subsequently displayed in the particular visual portlet. For example, a visual portlet could include several hyperlinks, each of which spawns its own web page for a separate news story. If user 42 selects a particular link, he/she has deliberately entered view mode for the spawned web page. In such an event, it can be presumed that user 42 is focusing on the spawned web page and portlet filter 38 will insert the targeted content into the content stream 46. Once portlet filter 38 has inserted any targeted content, stream(s) 48 are outputted to aggregator 38, which will organize (i.e., aggregate) the stream(s) 48 into portal page 50 for display to user 42.

In a typical embodiment, targeted content is inserted into the portlet content stream by portlet filter 38 when a desired display mode causes a full web page, or a web page having only one type of information displayed. To this extent, portlet filter 38 could be programmed with a set of rules that dictates when targeted content should be inserted. It should be understood, however, that any criteria could be established for inserting targeted content based on a desired display mode. In addition, portlet filter 38 typically inserts the targeted content by building a table in markup that combines the targeted content with the web content in portlet content stream 46. An example of such a table is as follows:

```
<TABLE>
    <TR>
        <TD>
            <!--ADVERTISTNG CONTENT-->
        <TD>
    <TR>
        <TR>
        <TD>
            <!--PORTLET CONTENT>
        <TD>
        <TR>
<TABLE
```

Figure 4:
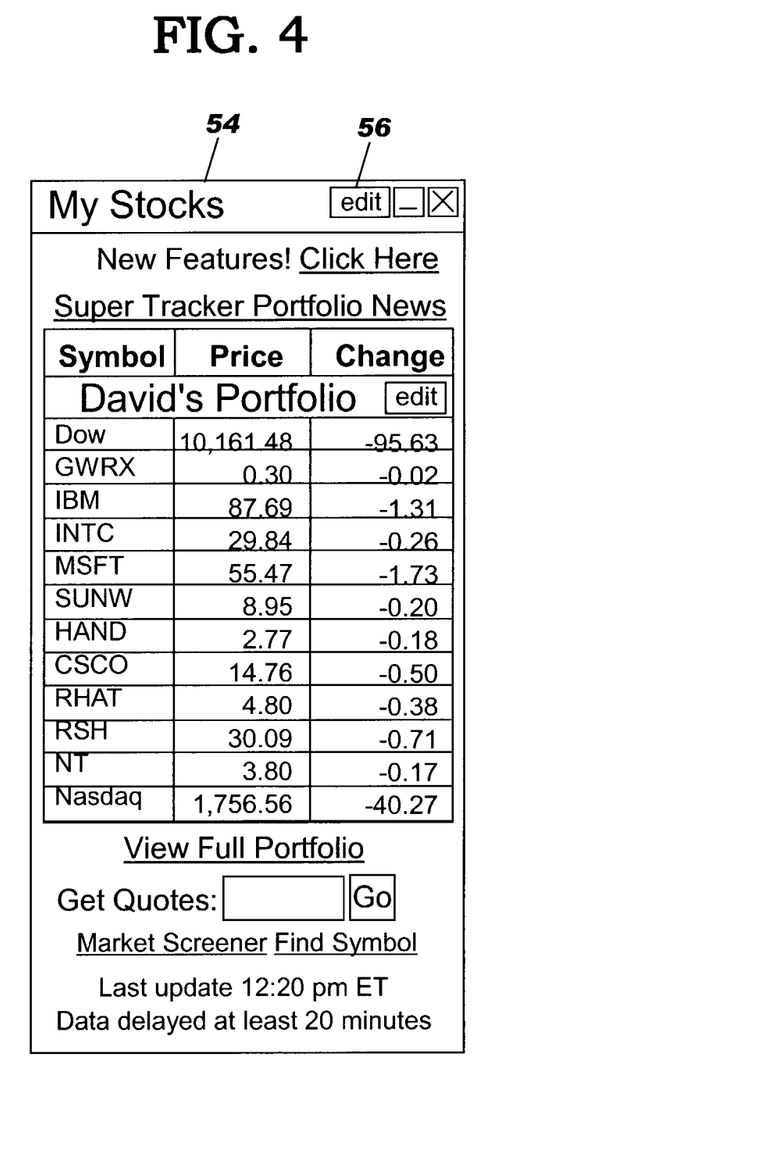
FIG. 4 depicts a portlet, according to the present invention.
Figure 5:
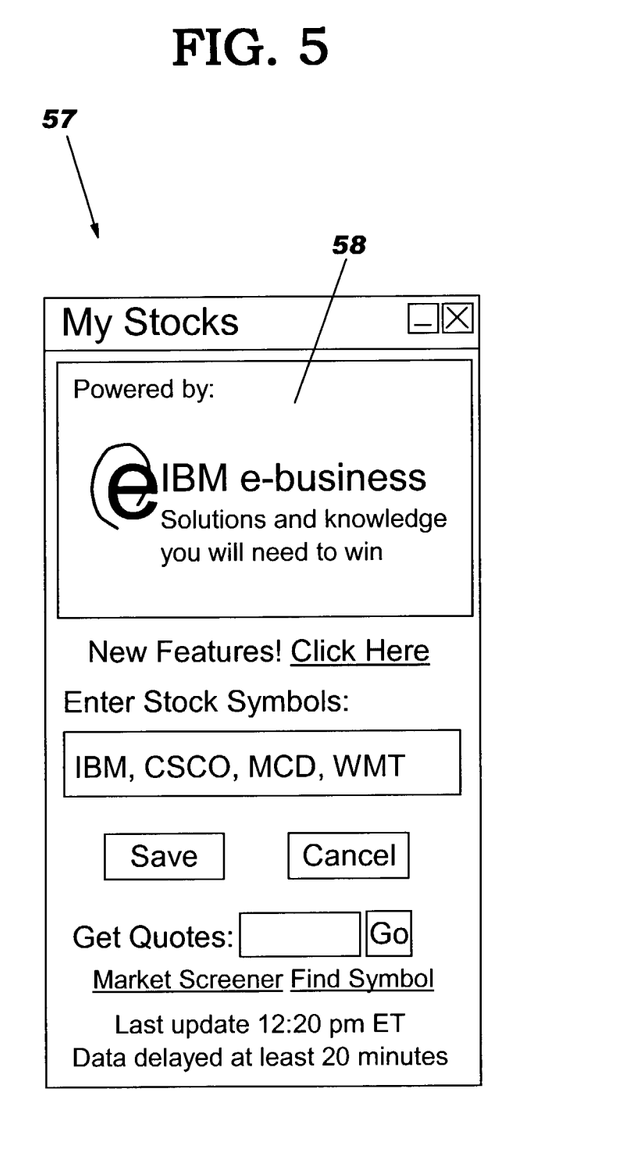
FIG. 5 depicts a portlet in edit mode having targeted content, according to the present invention.
Figure 6:
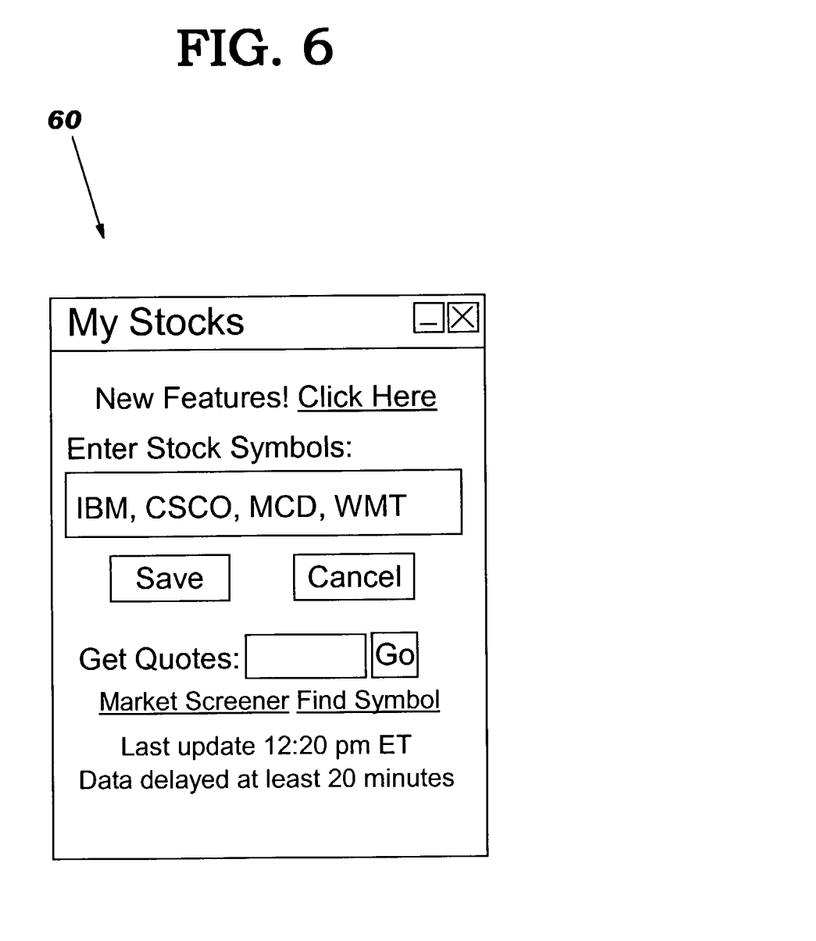
FIG. 6 depicts a related art portlet in edit mode.

Referring to FIG. 4, an exemplary visual portlet 54 is shown. As depicted, visual portlet 54 is a stock portlet. Under the present invention, if user 42 enters edit mode by selecting edit button 56, targeted content will be inserted into the subsequent edit window 57 shown in FIG. 5. As depicted in FIG. 5, an advertisement 58 has been inserted. As indicated above, because the edit window 57 is the only item displayed to user 42 when edit mode is entered, he/she is more likely to view advertisement 58. Moreover, because the type of targeted content can be selected based on user data, advertisement 58 is tailored to the interests of user 42 and, hence, is more likely to make an impact. Under previous systems, content was not inserted based on a desired display mode. That is, entering the edit mode under previous systems yielded solely an edit window as shown in FIG. 6 (i.e., without targeted content). Accordingly, previous systems failed to take advantage of user's 42 focused attention.

Figure 7:
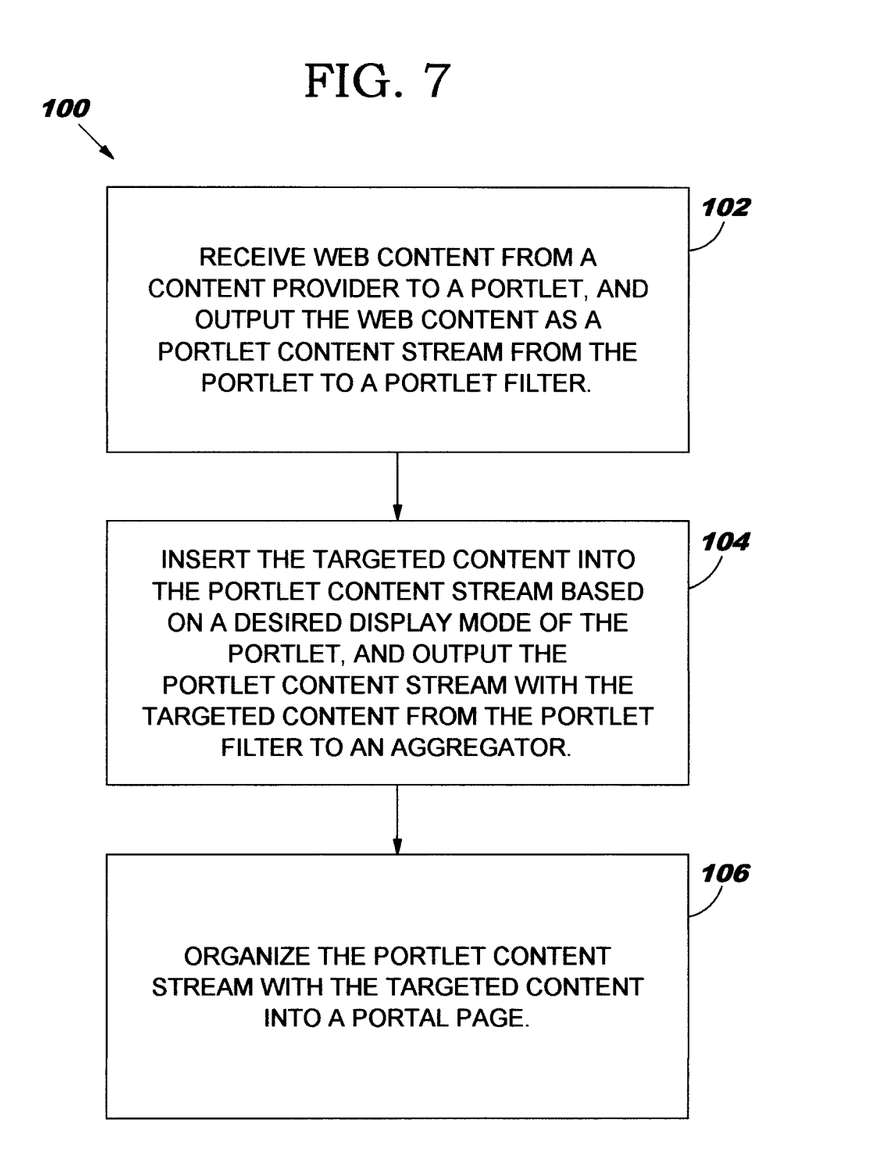
FIG. 7 depicts a method flow diagram, according to the present invention.

Referring now to FIG. 7, a method flow diagram 100 according to the present invention is shown. As depicted, first step 102 is to receive web content from a content provider to a portlet, and output the web content as a portlet content stream from the portlet to a portlet filter. Second step 104 is to insert targeted content into the portlet content stream based on a desired display mode of the portlet, and output the portlet content stream with the targeted content from the portlet filter to an aggregator. Third step 106 is to organize the portlet content stream with the inserted targeted content into a portal page.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls computer system 20 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system 13 is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, it should be understood that while the present invention is typically implemented based on a desired display mode of a portlet, other variations could exist. To this extent, the present invention could be implemented based on different modalities of a portal page (e.g., in which individual portlets on the portal page are sized differently).

What is claimed is:

1. A system for inserting targeted content into a portlet content stream, comprising:
    a computer comprising a processor; and
    instructions which are executable, using the processor, to perform functions comprising:
        executing a portal program for displaying a portal page on a user interface, the portal program comprising:
            a content aggregator for organizing a portlet content stream into the portal page for the displaying; and
            a portlet filter; and
        executing a portlet for obtaining web content from a content provider and for outputting the web content, as the portlet content stream, to the portlet filter, the portlet filter interposed between the portlet and the content aggregator, the portlet filter adapted for:
            receiving the portlet content stream outputted from the portlet;
            inserting the targeted content into the received portlet content stream, responsive to a command issued from the portal page to enter a desired display mode which will cause display of a content page that is distinct from the portal page, thereby creating a merged content stream; and
            forwarding the merged content stream to the content aggregator as the portlet content stream for the organizing into the portal page for the displaying.

2. The system of claim 1, wherein the web content is obtained by the portlet from the content provider over a network.

3. The system of claim 1, wherein the portlet content stream is a markup content stream.

4. The system of claim 1, wherein the portlet filter inserts the targeted content by building a table that combines the targeted content with the received portlet content stream, such that each of the targeted content and the received portlet content stream occupy distinct rows of the table.

5. The system of claim 1, wherein the portlet filter further removes web content from the portlet content stream.

6. The system of claim 1, wherein the portlet filter further selects a type of the targeted content based on user data.

7. The system of claim 1, wherein the targeted content is an advertisement.

8. The system of claim 1, wherein the desired display mode will display the distinct content page as a full screen.

9. A method for inserting targeted content into a portlet content stream, comprising:
    receiving web content from a content provider to a portlet, and outputting the web content as the portlet content stream from the portlet to a portlet filter, the portlet filter interposed between the portlet and a content aggregator of a portal program that displays a portal page on a user interface;
    receiving the outputted portlet content stream at the portlet filter;
    inserting the targeted content into the received portlet content stream, by the portlet filter in response to a command issued from the portal page to enter a desired display mode which will cause display of a content page that is distinct from the portal page, thereby creating a merged content stream; and
    outputting the merged content stream from the portlet filter to the content aggregator, as the portlet content stream, for organizing into the portal page.

10. The method of claim 9, wherein the received web content is received from the content provider over a network.

11. The method of claim 9, wherein the inserting comprises building a table that combines the targeted content with the received portlet content stream, such that each of the targeted content and the received portlet content stream occupy distinct rows of the table.

12. The method of claim 9, further comprising removing web content from the received portlet content stream, prior to outputting the merged portlet content stream to the content aggregator.

13. The method of claim 9, further comprising selecting a type of the targeted content based on user data, prior to inserting the targeted content.

14. The method of claim 9, wherein the targeted content is an advertisement.

15. The method of claim 9, wherein the desired display mode will display the distinct content page as a full screen.

16. A program product stored on a non-transitory recordable medium for inserting targeted content into a portlet content stream, the program product comprising program code which, when executed, causes a computer to perform:
    obtaining web content by a portlet from a content provider, and outputting the web content as the portlet content stream from the portlet to a portlet filter, the portlet filter interposed between the portlet and a content aggregator of a portal program that displays a portal page on a user interface;
    receiving the outputted portlet content stream at the portlet filter;
    inserting the targeted content into the received portlet content stream, by the portlet filter in response to a command issued from the portal page to enter a desired display mode which will cause display of a content page that is distinct from the portal page, thereby creating a merged content stream; and
    forwarding the merged content stream, as the portlet content stream, from the portlet filter to the content aggregator for organizing into the portal page.

17. The program product of claim 16, wherein the web content is obtained from the content provider over a network.

18. The program product of claim 16, wherein the portlet content stream is a markup content stream.

19. The program product of claim 16, wherein the inserting inserts the targeted content by building a table that combines the targeted content with the received portlet content stream, such that each of the targeted content and the received portlet content stream occupy distinct rows of the table.

20. The program product of claim 16, wherein the inserting further removes web content from the received portlet content stream.

21. The program product of claim 16, wherein the inserting further selects a type of the targeted content based on user data.

22. The program product of claim 16, wherein the targeted content is an advertisement.

23. The program product of claim 16, wherein the desired display mode will display the distinct content page as a full screen.

24. The program product of claim 16, wherein the program product comprises the portal program.

* * * * *